United States Patent
Shenfield et al.

(10) Patent No.: US 9,002,975 B2
(45) Date of Patent: Apr. 7, 2015

(54) METHOD AND SYSTEM FOR MEDIATED ACCESS TO A DATA FACADE ON A MOBILE DEVICE

(75) Inventors: Michael Shenfield, Richmond Hill (CA); Gaelle Martin-Cocher, Toronto (CA); Suresh Chitturi, Plano, TX (US)

(73) Assignee: BlackBerry Limited (CA)

( * ) Notice: Subject to any disclaimer, the term of this patent is extended or adjusted under 35 U.S.C. 154(b) by 1546 days.

(21) Appl. No.: 12/209,798

(22) Filed: Sep. 12, 2008

(65) Prior Publication Data
US 2010/0070606 A1   Mar. 18, 2010

(51) Int. Cl.
| | |
|---|---|
| G06F 15/16 | (2006.01) |
| G06Q 20/12 | (2012.01) |
| G06Q 20/32 | (2012.01) |
| G06Q 30/02 | (2012.01) |
| H04L 29/08 | (2006.01) |
| G06Q 30/00 | (2012.01) |

(52) U.S. Cl.
CPC ............... *G06Q 30/00* (2013.01); *G06Q 20/12* (2013.01); *G06Q 20/123* (2013.01); *G06Q 20/32* (2013.01); *G06Q 20/322* (2013.01); *G06Q 30/02* (2013.01); *H04L 67/20* (2013.01); *H04L 67/30* (2013.01); *H04L 67/327* (2013.01)

(58) Field of Classification Search
USPC ............................ 709/203, 217; 705/14.4, 14.5
See application file for complete search history.

(56) References Cited

U.S. PATENT DOCUMENTS

| | | | |
|---|---|---|---|
| 7,010,492 B1 * | 3/2006 | Bassett et al. ................. | 705/14.1 |
| 7,395,031 B1 | 7/2008 | Ritter | |
| 7,689,510 B2 * | 3/2010 | Lamkin et al. .................. | 705/51 |
| 2001/0049620 A1 * | 12/2001 | Blasko ............................ | 705/10 |
| 2002/0100041 A1 | 7/2002 | Rosenberg et al. | |
| 2007/0220558 A1 | 9/2007 | Jung | |
| 2007/0260673 A1 * | 11/2007 | Shenfield et al. ............. | 709/203 |
| 2007/0260674 A1 * | 11/2007 | Shenfield ...................... | 709/203 |
| 2008/0065688 A1 | 3/2008 | Shenfield | |
| 2008/0092181 A1 * | 4/2008 | Britt ................................ | 725/87 |

(Continued)

FOREIGN PATENT DOCUMENTS

| | | |
|---|---|---|
| EP | 2026269 A1 | 2/2009 |
| EP | 2154891 A1 | 2/2010 |

(Continued)

OTHER PUBLICATIONS

Brenner et al. "The Open Mobile Alliance", published on Feb. 8, 2008, pp. 321-335.*

(Continued)

*Primary Examiner* — David Lazaro
*Assistant Examiner* — Vitali Korobov
(74) *Attorney, Agent, or Firm* — Schwegman Lundberg & Woessner, P.A.

(57) ABSTRACT

A content delivery system, a mobile subscriber terminal and method for mediated access to a data facade are generally described herein. In some embodiments, the mobile subscriber terminal includes one or more applications that may request advertisements, a mediator client, and a delivery client operating as a data facade that interfaces with a delivery server. The mediator client may generate an application profile based on advertising preferences of the applications and may register with the data facade using the application profile. The mediator client may identify, filter and select advertisements to provide targeted content in response to requests from the applications.

16 Claims, 7 Drawing Sheets

(56) References Cited

U.S. PATENT DOCUMENTS

| | | | |
|---|---|---|---|
| 2008/0098420 A1 | 4/2008 | Khivesara | |
| 2008/0189360 A1* | 8/2008 | Kiley et al. | 709/203 |
| 2010/0036711 A1* | 2/2010 | Shenfield et al. | 705/10 |
| 2010/0036737 A1* | 2/2010 | Shenfield et al. | 705/14.59 |
| 2010/0036909 A1* | 2/2010 | Lee et al. | 709/203 |
| 2010/0131584 A1* | 5/2010 | Johnson | 709/203 |
| 2011/0167458 A1 | 7/2011 | Shenfield et al. | |

FOREIGN PATENT DOCUMENTS

| | | | |
|---|---|---|---|
| WO | WO-2008153306 A2 | 12/2008 | |
| WO | WO-2010030316 A1 | 3/2010 | |
| WO | WO-2010030408 A2 | 3/2010 | |
| WO | WO-2010030408 A3 | 11/2010 | |

OTHER PUBLICATIONS

Brenner et al. "The Open Mobile Alliance", published by John Wiley & Sons on Feb. 8, 2008, section 27.4, pp. 421, 424-426.*

Brenner et al. "The Open Mobile Alliance", published by John Wiley & Sons on Feb. 8, 2008, pp. 321-335.*

"Dynamic Content Delivery Architecture Draft Version 1.0", [online] [Retrieved on Dec. 9, 2009] Retrieved from: http://member.openmobilealliance.org/ftp/Public_documents/cd/Permanent_documents /OMA-AD-DCD-V1~0-20080908-C.zip>, Sections 4, 4.3.1, 5.2, 5.4, 5.5.1.2, 5.5.1, (Sep. 8, 2008), 57 pgs.

"International Application Serial No. PCT/US2009/003975, Search Report mailed Dec. 30, 2009", 5 pgs.

"International Application Serial No. PCT/US2009/003975, Written Opinion mailed Dec. 30, 2009", 8 pgs.

"Dynamic Content Delivery Architecture", Draft Version 1.0 / OMA-AD-DCD-V1 0-20080501-D, © 2008 Open Mobile Alliance Ltd., (May 1, 2008), 56 pgs.

"Dynamic Content Delivery Technical Specification—Semantics and Transactions", Draft Version 1.0 / OMA-TS-DCD Semantics V1 0-20080716-D, © 2008 Open Mobile Alliance Ltd., (Jul. 16, 2008), 220 pgs.

"Mobile Advertising Architecture", Draft Version 1.0 / OMA-AD-Mobile Advertising-V1 0-20080708-D, © 2008 Open mobile Alliance Ltd., (Jul. 8, 2008), 19 pgs.

"Mobile Broadcast Services", Draft Version 1.1 / OMA-TS-BCAST Services-V1 1-20080707-D, © 2008 Open Mobile Alliance Ltd., (Jul. 7, 2008), 151 pgs.

"Service Guide for Mobile Broadcast Services", Candidate Version 1.1 / OMA-TS-BCAST Service Guide-V1 1-20080707-D, © 2008 Open Mobile Alliance Ltd., (Jul. 7, 2008), 213 pgs.

"International Application Serial No. PCT/US2009038097, Search Report mailed Jun. 24, 2010", 2 pgs.

"International Application Serial No. PCT/US2009038097, Written Opinion mailed Jun. 24, 2010", 10 pgs.

"U.S. Appl. No. 13/063,735, Non Final Office Action mailed Jan. 8, 2013", 9 pgs.

"U.S. Appl. No. 13/063,735, Preliminary Amendment mailed Mar. 11, 2011", 7 pgs.

"Canadian Application Serial No. 2,736,741, Office Action mailed Aug. 14, 2014", 3 pgs.

"Canadian Application Serial No. 2,736,741, Office Action mailed Sep. 4, 2013", 2 pgs.

"Canadian Application Serial No. 2,736,741, Response filed Feb. 26, 2014 to Office Action mailed Sep. 4, 2013", 15 pgs.

"Canadian Application Serial No. 2,737,306, Office Action mailed Aug. 19, 2013", 4 pgs.

"Dynamic Content Delivery Architecture", Open Mobile Alliance, [Online]. Retrieved from Internet: <http://technical.openmobilealliance.org/Technical/Release_program/docs/DCD/V1_0-20081223-C/OMA-AD-DCD-V1_0-20081223-C.pdf>, 1-55.

"Dynamic Content Delivery Architecture Draft Version 1.0", Open Mobile Alliance, [Online]. Retrieved from the Internet: <URL: http://member.openmobilealliance.org/ftp/Public_documents/cd/Permanent_documents/OMA-AD-DCD-V1_0-20080908-C.zip>, (Sep. 8, 2008), Sections 4, 4.3.1, 5.2, 5.4, 5.5.1.2, 5.5.1.3, 5.5.1.4, 5.5.3.2, A.5, A.6, B.1 figures 1,2,4.

"Dynamic Content Delivery Architecture Draft Version 1.0", Open Mobile Alliance, XP002559778, [Online]. Retrieved from Internet:<http://member.openmobilealliance.org/ftp/Public_documents/cd/Permanent_documents/OMA-AD-DCD-V1_0-20080908-C.zip>, (Accessed Dec. 9, 2009), 90 pgs.

"Dynamic Content Delivery Architecture Draft Version 1.0", XP 002559778, [Online]. Retrieved from the Internet: <URL: http://www.openmobilealliance.org/>, (Aug. 8, 2007).

"European Application Serial No. 09788873.9, Office action mailed Jan. 18, 2013", 7 pgs.

"European Application Serial No. 09788873.9, Office Action mailed Dec. 8, 2011", 5 pgs.

"European Application Serial No. 09788873.9, Response filed Jun. 18, 2012 to Office Action mailed Dec. 8, 2011", 9 pgs.

"European Application Serial No. 09810896.2, Examination Notification Art. 94(3) mailed Jan. 18, 2013", 3 pgs.

"European Application Serial No. 09810896.2, Extended Search Report mailed Dec. 19, 2011", 7 pgs.

"European Application Serial No. 09810896.2, Response filed May 21, 2013 to Office Action mailed Jan. 18, 2013", 16 pgs.

"European Application Serial No. 09810896.2, Response filed Jun. 27, 2012 to Extended Search Report mailed Dec. 19, 2011", 13 pgs.

"International Application Serial No. PCT/US2009/003975, Amendment filed Jul. 9, 2010", 7 pgs.

"International Application Serial No. PCT/US2009/003975, International Preliminary Report on Patentability mailed Nov. 16, 2010", 9 pgs.

"International Application Serial No. PCT/US2009/038097, Demand filed Sep. 17, 2010", 19 pgs.

"International Application Serial No. PCT/US2009/038097, International Preliminary Examination Report mailed Nov. 23, 2010", 9 pgs.

"International Application Serial No. PCT/US2009038097, Corrected International Preliminary Report on Patentability mailed Dec. 16, 2010", 13 pgs.

* cited by examiner

METHOD AND SYSTEM FOR MEDIATED ACCESS TO A DATA FACADE ON A MOBILE DEVICE

TECHNICAL FIELD

Some embodiments pertain to mobile content delivery such as mobile advertising. Some embodiments pertain to the open mobile alliance (OMA). Some embodiments pertain to the Dynamic Content Delivery (DCD) architecture of the OMA. Some embodiments relate to the use of a data facade for delivering targeted content, such as targeted advertising.

BACKGROUND

Mobile devices may operate one or more applications that may be configured to request advertisements. One issue with mobile advertising is delivering personalized and contextualized advertising to the particular user and to each of the particular applications operating on these mobile devices. Another issue with mobile advertising is to simplify the access to advertisements by applications that might not be aware of the various available delivery mechanisms to which a registration process is often needed.

DETAILED DESCRIPTION

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments set forth in the claims encompass all available equivalents of those claims.

Figure 1:
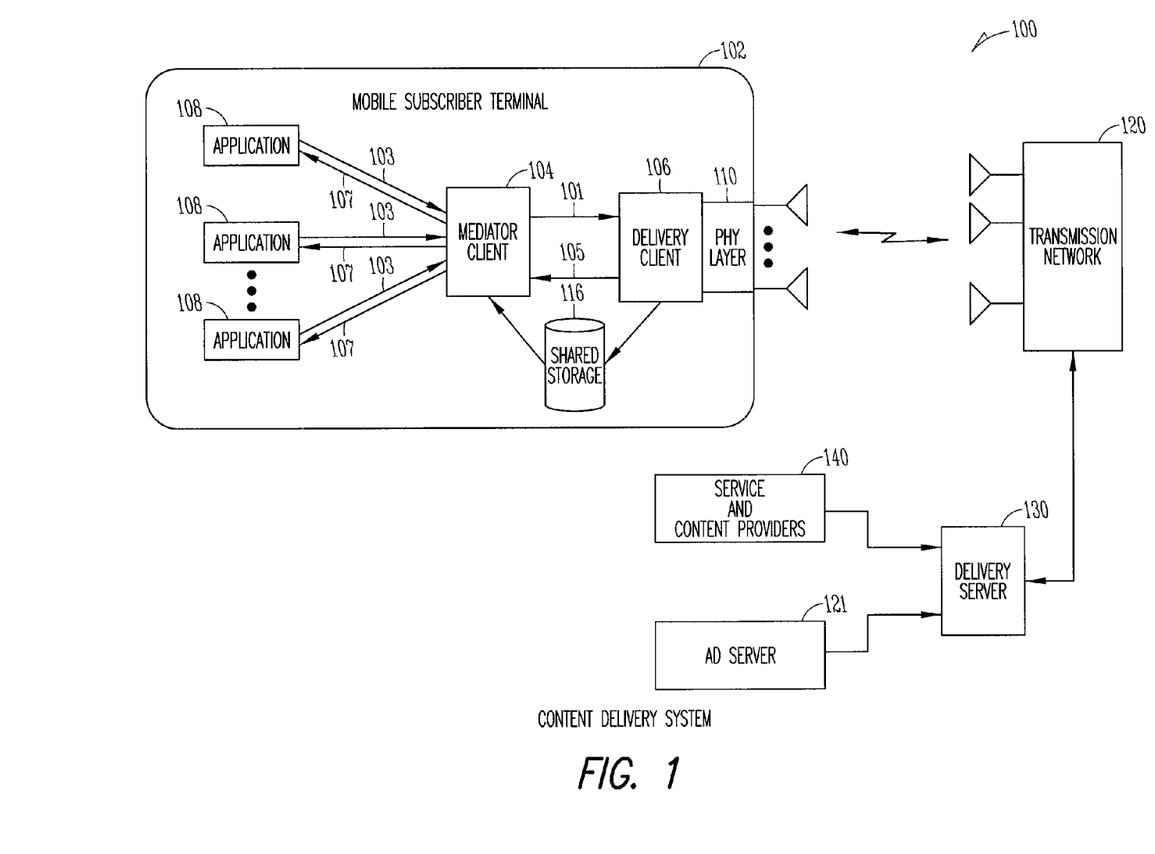
FIG. 1 is a content delivery system in accordance with some embodiments.

FIG. 1 is a content delivery system in accordance with some embodiments. Content delivery system 100 includes a delivery server 130, one or more mobile subscriber terminals, such as mobile subscriber terminal 102, and transmission network 120. Delivery server 130 provides content to the mobile subscriber terminals through transmission network 120. Transmission network 120 may include terrestrial transmission networks as well as satellite-based transmission networks. Content as well as services may be provided by one or more service and content providers 140. In some embodiments described in more detail below, advertisement content may be provided by ad server 121.

As illustrated in FIG. 1, mobile subscriber terminal 102 may include one or more applications 108, mediator client 104, delivery client 106, physical layer 110, and shared storage element 116. In accordance with embodiments, delivery client 106 may operate logically as a data facade (i.e., to perform a logical role) to provide access to server side data. These embodiments are described in more detail below.

In some embodiments, delivery client 106 and delivery server 130 may together comprise a delivery enabler. In some embodiments delivery client 106 may operate as a dynamic content delivery (DCD) client and delivery server 130 may operate as a DCD server. In other embodiments, delivery client 106 may operate as a broadcasting services client and delivery server 130 may operate as a broadcasting services server. These embodiments are described in more detail below. In some other embodiments, delivery client 106 may operate as both a DCD client and a broadcasting services client, and delivery server 130 may operate as both a DCD server and a broadcasting services server. These embodiments are also discussed in more detail below. In embodiments when delivery client 106 operates as a DCD client, mediator client 104 may operate as a DCD enabled client application (DECA).

In some embodiments, content delivery system 100 may be configured to provide a mobile broadcasting delivery solution. In these embodiments, content delivery system 100 may operate in accordance with one or more mobile broadcasting techniques and/or specifications, such as the Open Mobile Alliance (OMA) Mobile Broadcast Services (BCAST) specifications, the Digital Video Broadcasting (DVB) specification for terrestrial (DVB-T), satellite (DVB-S), hybrid-satellite (DVB-H) and satellite-handheld (DVB-SH) of the European Telecommunications Standards Institution (ETSI), and/or the MediaFlo specifications of the Telecommunications Industry Association (TIA), although the scope of the embodiments is not limited to any of these techniques and/or specifications. In some mobile broadcasting embodiments, delivery server 130 may operate as a BCAST server and delivery client 106 may operate as a BCAST client.

In some embodiments, content delivery system 100 may be part of a WiMax or a $3^{rd}$ Generation Partnership Project (3GPP)-LTE (4G) communication system configured to provide mobile broadcasting services in accordance with the IEEE 802.16(e) or the 3GPP-LTE communication standards. In these embodiments, transmission network 120 may use orthogonal frequency division multiple access (OFDMA) as an access technique and for broadcasting, although the scope of the embodiments is not limited in this respect.

In some embodiments, mobile subscriber terminal 102 may be a portable wireless communication device, such as a personal digital assistant (PDA), a laptop or portable computer with wireless communication capability, a web tablet, a wireless telephone, a wireless headset, a pager, an instant messaging device, a digital camera, an access point, a television, or other device that may receive and/or transmit information wirelessly using one or more antennas. The antennas may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input, multiple-output (MIMO) embodiments, the antennas may be effectively separated to take advantage of spatial diversity and the different channel characteristics that may result between the different antennas and one or more base stations of transmission network 120.

Although many embodiments are directed mobile devices and wireless communications, the scope of this disclosure is not limited in this respect. Embodiments are applicable to almost any type of communication terminal, such as a personal computer or set-top-box that can be connected to a broadband content delivery system.

In accordance with embodiments, the one or more applications 108 operating on mobile subscriber terminal 102 may be configured to request advertisements (ads). Delivery client 106 operating as the data facade on terminal 102 may be configured to interface with delivery server 130 and mediator client 104. Mediator client 104 may be configured to generate an application profile (AP) 101 based on ad-related preferences of applications 108, ad-related preferences of a user, device capabilities among other information. Mediator client 104 may register with delivery client 106 and may provide AP 101. Delivery client 106 may provide advertisements to mediator client 104 according to AP 101 and mediator client 104 may select and provide targeted ads to applications 108 in response to ad requests 103. These embodiments are described in more detail below. Delivery client 106 may receive ad content from ad server 121, such as ad server 121 (FIG. 1) via delivery server 130.

In accordance with some embodiments, delivery client 106 and delivery server 130 may operate as a delivery enabler to filter advertisement content based on the AP provided by mediator client 104, and provide filtered advertisement content 105 for use by mediator client 104. In some embodiments, delivery client 106 may perform the filtering, while in other embodiments, delivery server 130 may perform the filtering. In some embodiments, mediator client 104 may be configured to perform advertisement selection for targeted advertising to applications 108, based on application type, application content, and/or ad-related preferences associated with each of applications 108, although the scope of the embodiments is not limited in this respect as other criteria may be used for content selection.

In some broadcasting services embodiments, delivery server 130 may use AP 101 to generate a subset of channels (e.g., channels of interest according to the AP) and mediator client 104 may subscribe for the channels of the subset on behalf of applications 108. In some of these embodiments, delivery Server 130 may use AP 101 to filter the content to help overcome any efficiencies of dynamic filtering performed by delivery client 106 at the time of delivery. In these embodiments, delivery server 130 may filter content before delivery at subscription or at the time of channel selection. For example, delivery server 130 may processes the broadcast service guide according to AP 101 and may provide the subset of channels to mediator client 104 for channel selection and/or subscription. In this way, further filtering of content at the time of delivery time may not be necessary because AP 101 is used to select appropriate channels to present to mediator client 104 (regardless whether this subset of channel was constructed at server or client).

Examples of applications 108 may include a browser application, a viewer application, a media player application, an email application, an instant messaging (IM) application, mobile e-commerce application, a phone application and any other application resident or operating on mobile subscriber terminal 102 that is configured to request advertisements. In some embodiments, applications 108 may comprise applications resident on mobile subscriber terminal 102 that request advertisements from mediator client 104. Applications 108 may pass relevant information along with ad requests 103 to facilitate the advertisement selection process. Such information may be the format of the requested advertisements (e.g., text, audio, video, and size), the topic (e.g., sport) of the requested advertisements, the application type, an application identifier (ID), an Ad identifier, etc.

Mediator client 104 may also be an application resident on mobile subscriber terminal 102 configured to perform one or more functions such as pre-fetching advertisements, requesting advertisements, collecting or receiving user and device information, tracking user interaction with advertisements, and reporting advertising metrics, although the scope of the embodiments is not limited in this respect. Mediator client 104 may also be configured to perform advertisement selection to provide targeted advertising to each of applications 108 (e.g., an advertisement relevant to the application type, the application content, user preferences, user profile or other criteria).

In some embodiments, mediator client 104 may be configured to combine ad-related preferences known by mediator client 104, such as preconfigured data and user preferences, with at least one or more of ad-related application preferences into an AP. This AP may be referred to a consolidated AP that includes the combined ad-related preferences. In some embodiments, mediator client 104 may be configured to retrieve ad-related preferences from applications 108 prior to generating AP. Alternatively, applications 108 may provide ad-related preferences directly to mediator client 104. In these embodiments, mediator client 104 may submit a mediator client identifier, which may be an application identifier that uniquely identifies the mediator client to delivery client 106. The mediator client identifier may be an attribute of a consolidated AP. Delivery client 106 may use the mediator client identifier, along with other information in the consolidated AP, to associate advertisement content with mediator client 104. In some of these embodiments, the consolidated AP may include ad-related preferences of all applications 108, although the scope of the embodiments is not limited in this respect.

In some alternate embodiments, mediator client 104 may be configured to generate an AP includes shared information of two or more of applications 108. The shared information may relate to device capabilities of mobile subscriber terminal 102 and to a user's interests or a user profile, although the scope of the embodiments is not limited in this respect. In some embodiments, mediator client 104 may be configured to combine ad-related preferences of at least two or more of applications 108 with shared information to generate the consolidated AP. In these embodiments, mediator client 104 may include ad-related preferences common to applications 108 in the consolidated AP. The ad-related preferences may be common to applications 108 and may relate to device capabilities of mobile subscriber terminal 102 and may relate to the user's interests, although the scope of the embodiments is not limited in this respect. In some embodiments, mediator client 104 may include contextual information describing a state of the mobile subscriber terminal. Contextual information may include the location of the terminal or the presence state of a user.

In some embodiments, mediator client 104 may be configured to submit an AP for each of applications 108 or submit an AP for group of two or more of applications 108 to delivery client 106. In these multiple AP embodiments, an AP for each of applications 108 (e.g., multiple APs) may be submitted to delivery client 106 when the ad-related preferences of applications 108 vary significantly. For example, an application 108 may have ad-related preferences that relate to movies and may support multi-media capabilities whereas another application 108 may have ad-related preferences that relate to stocks and may support only text capabilities.

In these multiple AP embodiments, mediator client 104 generates various mediator client identifiers that are provided to delivery client 106. Mediator client 104 is seen by delivery client 106 operating as multiple applications. The mediator client identifier generated by mediator client 104 on behalf of each individual application 108 or each group of applications 108, may include a name, universal resource identifier (URI) or hash code of an individual application 108 or an associated group of applications 108. Each of the mediator client identifiers may be either alphanumeric or numeric. In these embodiments, delivery client 106 may use the mediator client identifier to associate advertising content with mediator client 104. Mediator client 104 may be configured to forward advertisement content to a target application 108 or group of applications 108 according to the specific mediator client identifier associated with the advertisement content. These embodiments are not only applicable to delivery of advertisement content, but are applicable to general mediated content delivery. For example, non-DCD (or non-BCAST) compliant applications may be enabled to obtain content from a DCD or a BCAST delivery enabler using mediator client 104, which may be DCD or BCAST compliant.

In consolidated AP embodiments, a consolidated AP that includes the combined ad-related preferences may be submitted when, for example, the ad-related preferences of applications 108 do not vary significantly. When the ad-related preferences of two or more of application 108 relate to a similar interest such as music, for example, the ad-related preferences are not considered to vary significantly.

In both the single AP and the multiple AP embodiments, mediator client 104 is configured to receive ads 105 from delivery client 106 and perform ad selection. Mediator client 104 may also be configured to deliver selected ads to applications 108. In some embodiments mediator client 104 may deliver selected ads directly to applications 108, while in other embodiments, mediator client may deliver selected ads by link to applications 108. When mediator client 104 delivers selected ads to applications 108 by link, the ads may be stored by delivery client 106 in shared storage element 116.

In some embodiments, various mediator client identifiers may be submitted with different APs to delivery client 106 from the same application (i.e., mediator client 104). From the perspective of delivery client 106, mediator client 104 may be viewed as a multitude of applications, each identified by a different application identifier. In these embodiments, mediator client 104 may maintain a mapping of applications 108 to APs using, for example, application identifiers, application names, or other items to identify applications 108. When content from delivery server 130 arrives, it may be augmented by the application identifier of the target application. This allows mediator client 104 to associate received content with one of the applications 108 "hidden behind" mediator client 108.

In some embodiments, mediator client 104 may include an application identifier as a part of the mediator client identifier within the AP. Mediator client 104 may construct the application identifiers using an identifier (such as URI) or the name of one of applications 108. Additionally, if delivery notification from delivery client 106 to mediator client 104 is done via HTTP post to a predefined URL (e.g., as defined in the AP), mediator client 104 may specify different URL's for content delivery notifications related to different APs. In this way, mediator client 104 can easily deliver the content to the correct application 108 passing the URL where the content was posted by delivery client 106. In some embodiments, a storage location may be specified by an application 108 when registered with mediator client 104. Alternatively, mediator client 104 may specify for delivery client 106 different storage locations (e.g., per each submitted AP) to store received content items when for retrieval by mediator client 104. In this way, mediator client 104 can easily deliver the content to the correct application 108 by passing the storage location. In some embodiments, the storage location may be specified by an application 108 when registered with mediator client 104.

Although several embodiments relate to advertising and are described as providing targeted advertising content, the scope of these embodiments is not limited in this respect as these embodiments equally apply to providing other types of targeted content. Although mediator client 104 and delivery client 106 are illustrated as separate functional elements, in some embodiments, mediator client 104 and delivery client 106 may operate as a single client application. Although many operations are described herein as being performed by delivery client 106, some of these operations may be performed by delivery server 130 as delivery client 106 and delivery server 130 together functionally comprise a single delivery enabler.

Figure 2:
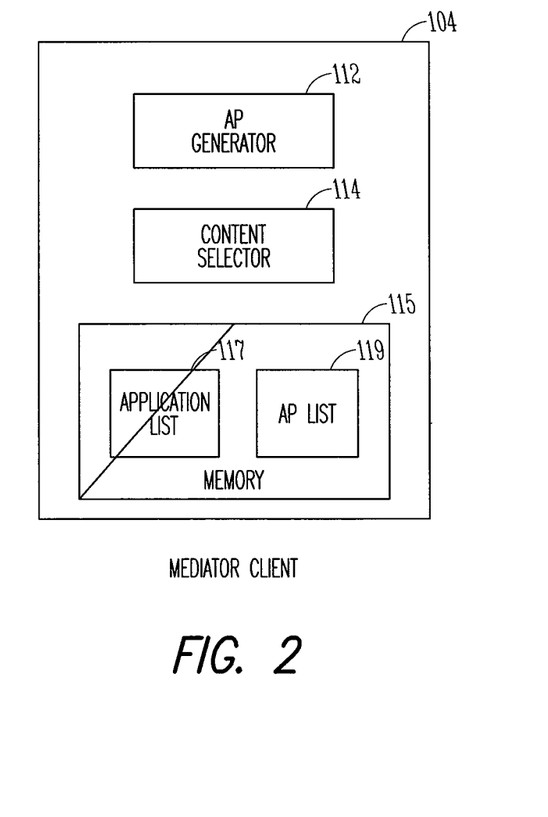
FIG. 2 illustrate some of the functional elements of a mediator client in accordance with some embodiments.

FIG. 2 illustrates some of the functional elements of a mediator client in accordance with some embodiments. Mediator client 104 illustrated in FIG. 2 may correspond to mediator client 104 of FIG. 1. Mediator client 104 may include application profile (AP) generator 112 to generate an AP, such as AP 101 (FIG. 1). Mediator client 104 may also include content selector 114 perform content selection and or content filtering, such as advertisement selection and/or advertisement filtering. Mediator client 104 may also include memory 115 to store application list 117, which may identify each of applications 108 (e.g., by application identifier) registered with mediator client 104 and/or known to mediator client 104. In some embodiments, memory 115 may be configured to store application profile (AP) list 119 when more than one application profile is used to register with delivery client 106 (FIG. 1) operating as the data facade. In some embodiments, AP list 119 may identify an AP for each of applications 108 or for groups of applications 108 as discussed above. AP list 119 may also identify the AP used to register with delivery client 106 for each of applications 108 or for groups of applications 108 as discussed above. Although memory 115 is illustrated as being within mediator client 104, memory 115 may be any memory structure within mobile subscriber terminal 102 (FIG. 1). Although specific embodiments of mediator client 104 related to advertisement selection and filtering are described herein, embodiments are application to the selection and filtering of any type of content.

Referring back to FIG. 1, in some embodiments, applications 108, mediator client 104, and delivery client 106 may operate on an application layer of mobile subscriber terminal 102 and may comprise one or more software-configured processing elements. Physical layer 110 may be configured to wirelessly communicate with transmission network 120 for receipt of content, such as broadcast content, advertisements and a service guide, among other things, from delivery server 130.

In some embodiments, mediator client 104 may include general ad-related preferences in a content-type field of channel selection metadata of the AP associated with mediator client 104 when registering with delivery client 106 for a selected channel. Among other things, the channel selection metadata, when included within an AP, may include Multipurpose Internet Mail Extensions (MIME) types as well as content types. Content types may refer to a topic (e.g., sport, news, business, messaging).

In some embodiments, shared storage element 116 may be configured to store ads provided by delivery client 106. Delivery client 106 may provide the ads for storage in shared storage element 116 based on AP 101 generated by mediator client 104. Since mediator client 104 may be configured to select ads that are stored in shared storage element 116, mediator client 104 does not have to wait for ad requests 103 from applications 108. This allows mediator client 104 to have filtered advertising content immediately available for applications 108 when an ad request 103 is received.

In some embodiments, mediator client 104 may be configured to retrieve ads from shared storage element 116 and provide the retrieved ads to applications 108 in ad-response messages 107. In these embodiments, content selector 114 (FIG. 2) may be configured to identify ads in shared storage element 116 based on ad-related preferences of applications 108 and provide ads to one of applications 108 based on the ad-related preferences associated therewith. In some embodiments, the ads selected from shared storage element 116 may be provided within ad response messages 107 in response to ad-requests 103.

In some alternate embodiments, mediator client 104 may be configured to identify ads stored in shared storage element 116 and provide links to the identified ads to applications 108 in ad-response messages 107. Applications 108 may be configured to retrieve the identified ads directly from shared storage element 116 using the provided links.

In DCD enabled embodiments, mediator client 104 may operate as DECA operating in accordance with the OMA DCD architecture specification. In these embodiments, delivery client 106 may operate as a DCD client configured to communicate with delivery server 130 operating as a DCD server. In these embodiments, the DCD client may be responsible for receiving content (e.g., via DCD channels) targeted to the registered DECA (i.e., mediator client 104) and may be responsible for managing (e.g., caching) this content on behalf of the DECA. Mediator client 104 operates as the front end of applications 108 toward the data facade and may perform on their behalf, a registration process, a subscription process and a personalization process with the data facade. The mediator client 104, operating as a DECA, may provide an AP to the DCD client and DCD server. The AP may be used by the DCD client to configure preferences and in some embodiments (broadcast and multicast deliver) to match application preferences for content (e.g., types, formats, topics, tags) to a subset of available channels that may be of interest to applications 108 via mediator client 104 operating as a DECA. In point-to-point delivery embodiments, this matching may be performed on the server side by the DCD server, however this is not a requirement as this matching may be performed in part by the DCD server and in part by the DCD client.

In some embodiments, a channel guide listing available channels may be delivered to mobile subscriber terminal 102 and ad matching may be performed on the client side by the DCD client (i.e., delivery client 106). Mediator client 104, operating as a DECA, may choose the channels of interest for application 108 by subscribing to these channels. In some embodiments, mediator client 104 may select channels of interest out of the subset created by matching the AP to channel characteristics. Following subscription to the channels, mediator client 104 may provide subscription filters that allow content providers to further personalize channel content for a user or a group of users. In these embodiments, subscription filters may provide an opaque mechanism to help ensure content targeting and personalization. Additionally, channel selection metadata within the AP may include a content-types attribute that may list generic tags or tokens for types of content of interest for each application 108. When content items contain metadata describing the content type of a content item, the DCD server and/or the DCD client may dynamically match the content item with the DECA that has subscribed to the particular channel and that may be interested in the particular content item. This matching may be done using pattern matching between the content-types attribute in the AP provided by the DECA and a content-types attribute in the metadata of the content item (e.g., content metadata), although the scope of the embodiments is not limited in this respect.

In accordance with some embodiments, when mediator client 104 operates as a DECA, it may provide for centralized data and/or content processing (e.g., storage, decompression, decoding, etc.), delivery of data received from the server side to mediator client 104, and sending application data to the server side.

In accordance with some other embodiments, when delivery client 106 is a data facade operating as a broadcast client, such as a BCAST client in accordance with the OMA BCAST specifications, parameters from a broadcast service guide (e.g., a BCAST service guide) may be used to personalize and contextualize the advertisement content. In some embodiments, a target user profile element (TUPE), such as the TUPE defined under both the service and content fragments, may be used as an "opt-in" capability for users. BCAST terminal settings on mobile subscriber terminal 102 may be configured to allow users to input their personal profile or preferences. BCAST terminal settings may also be configured to indicate whether to allow the broadcast service to be automatically filtered based on the users' personal attributes without the users' request. In some embodiments, an end-user preferences element may allow user preferences to be reported back to delivery server 130, operating as a broadcast server, through an interaction channel (e.g., using hypertext transfer protocol (HTTP) post). In accordance with some embodiments, parameters of the AP provided by mediator client 104, such as content types, may be used by delivery client 106 as the values of BCAST elements to facilitate targeting of content and channel selection, as described herein.

Figure 3A:
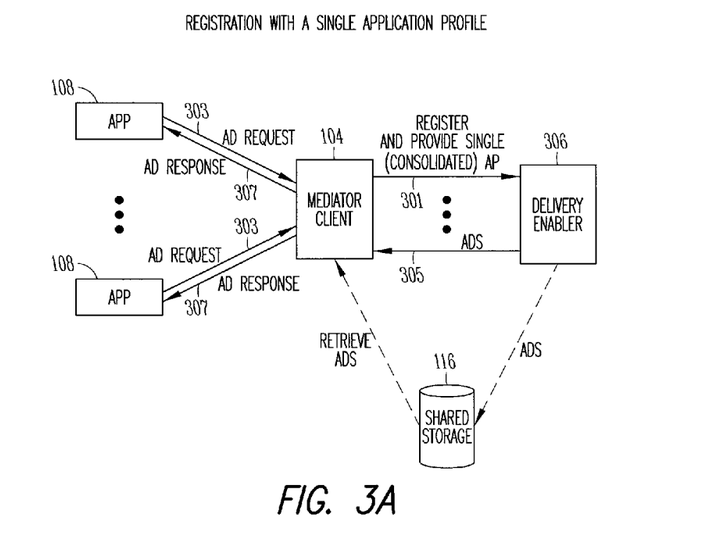
FIGS. 3A and 3B illustrate the operation of a mediator client when registering with a consolidated application profile (AP) in accordance with some embodiments.
Figure 3B:
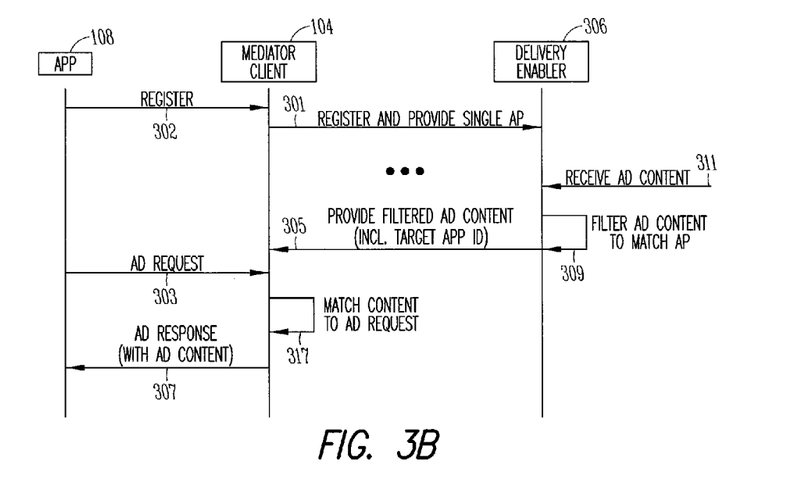

FIGS. 3A and 3B illustrate the operation of a mediator client when registering with a consolidated application profile (AP) in accordance with some embodiments. In these embodiments, mediator client 104 operates as an intermediary between delivery enabler 306 and applications 108. Deliver enabler 306 functionally may comprise delivery client 106 (FIG. 1) and delivery server 130 (FIG. 1). Mediator client 104 may generate consolidated AP 301 and may register with delivery enabler 306 using single consolidated AP 301. In some embodiments, AP 301 may include combined preferences relevant to all registered applications 108. In some embodiments, AP 301 may include some common preferences (e.g., preferences related to device capabilities and user interests), although the scope of the embodiments is not limited in this respect. AP 301 may be generated from information provided by or retrieved from applications 108.

In some embodiments, mediator client 104 may use a content-type field in AP 301 to express general preferences, although the scope of the embodiments is not limited in this respect. The content-type field may be part of channel selection metadata which may be part of AP 301, although the scope of the embodiments is not limited in this respect.

In the embodiments illustrated in FIGS. 3A and 3B, mediator client 104 receives ads 305 from delivery enabler 306 and performs ad selection in operation 317 to match content to ad requests 303. The selected ads may be delivered in ad response messages 307 to the appropriate application 108. Delivery enabler 306 may receive ad content 311 from an ad server, such as ad server 121 (FIG. 1), and may filter the ad content 311 in operation 309 to match the ad content to AP 301 of mediator client 104. In some embodiments, ads may be stored in shared storage element 116 for retrieval by mediator client 104.

Shared storage element 116 may either be in the form of a shared memory or a persistent storage. In some embodiments, a unique content identifier (e.g., an ad identifier) or a URI (e.g., file name, local URI) may be associated with each of the ads stored and the unique content identifier may be referenced in the response that is sent back to mediator client 104. This allows mediator client 104 to retrieve the content from shared storage element 116 based on the unique content identifier.

In the embodiments when delivery client 106 (FIG. 1) operates as a DCD client, mediator client 104 operates as a DECA and is registered to the DCD client. Ad requests 303 are received by mediator client 104, which receives the ads from the DCD client. In these embodiments, mediator client 104 may provide delivery client 106 (FIG. 1) with AP 301 to receive personalized and contextualized ads. As discussed above, AP 301 provided by mediator client 104 may include information such as known user interests, devices capabilities, known application preferences/context: content types, data formats (e.g., MIME type), subject area or specialization (e.g., "financial news", "weather", "travel planner"), etc. In some embodiments, mediator client 104 may be provisioned with such information (e.g., using OMA device management specifications including management objects (MO) specifications), although the scope of the embodiments is not limited in this respect.

In some embodiments, consolidated AP 301 may be based on preferences for multiple applications 108. For example, consolidated AP 301 may include preferences for "sports", "travel", "finance" and music (e.g., in the content-type field). In some embodiments, this ad-related application preference information may be obtained from applications 108 when applications 108 register with mediator client 104 in operation 302, when applications 108 are provisioned, or by extracting information from ad requests 303, although the scope of the embodiments is not limited in this respect.

In some alternate embodiments, applications 108 may generate their own APs. In these embodiments, consolidated AP 301 generated by mediator client 104 may be a composition of such APs of applications 108. The APs of applications 108 may be provided to mediator client 104 when applications 108 register with mediator client 104 in operation 302, or, for example, when applications 108 are provisioned.

In some embodiments, once mediator client 104 generates consolidated AP 301, consolidated AP 301 may be updated when, for example, ad-related preferences of any of applications 108 change (e.g., a change in user interests). In some embodiments, consolidated AP 301 may be uniquely identified by a mediator client identifier attribute. In these embodiments, mediator client 104 may submit consolidated AP 301 to delivery client 106 and may specify the mediator client identifier (e.g., App ID="mediator client on behalf of one of applications 108"). The mediator client identifier of mediator client 104 may be used by delivery enabler 306 to associate content with mediator client 104. Mediator client 104 may deliver the received content to a target application (i.e., one of applications 108). When using consolidated AP 301, as illustrated in FIGS. 3A and 3B, mediator client 104 may be responsible for analyzing filtered ad content 305 in operation 317 and delivering matched ad content to a particular application 108 in an ad response message 307 upon request.

In some embodiments, consolidated AP 301 may specify generic preferences for applications 108 as a content-types attribute of channel selection metadata as discussed above, which may be included in consolidated AP 301. In DCD enabled embodiments, the structure of the content-types field may specify predefined parameters (e.g., interests, tags, etc.) when this attribute is used by mediator client 104. For example, an XML schema extension mechanism may be used to define additional namespace and schema that specifies attributes and elements when these are used in the mobile advertising. This format may provide for reduced or more effective semantic processing when compared to the use of more conventional comma-separated free text.

In some embodiments, mediator client 104, operating as an intermediary, may be configured to perform filtering and ad selection of advertisement content 305 received according to consolidated AP 301. Mediator client 104 may also provide the relevant ad content to an appropriate one of applications 108 (e.g., by advertisement content push, availability notification, or ad response message 307). With consolidated AP 301, ads 305 that are received are relevant to one of applications 108 allowing mediator client 104 to perform an analysis to identify which one of ad applications 108 that the received ad content is targeted to. For example, mediator client 104 may match an ad request 303 to ad metadata to identify appropriate ads. Mediator client 104 may also process filtered ad content 305 upon receipt from delivery enabler 306 and identify the targeted ad application 108 based on the ad metadata and the preferences of applications 108.

Figure 4A:
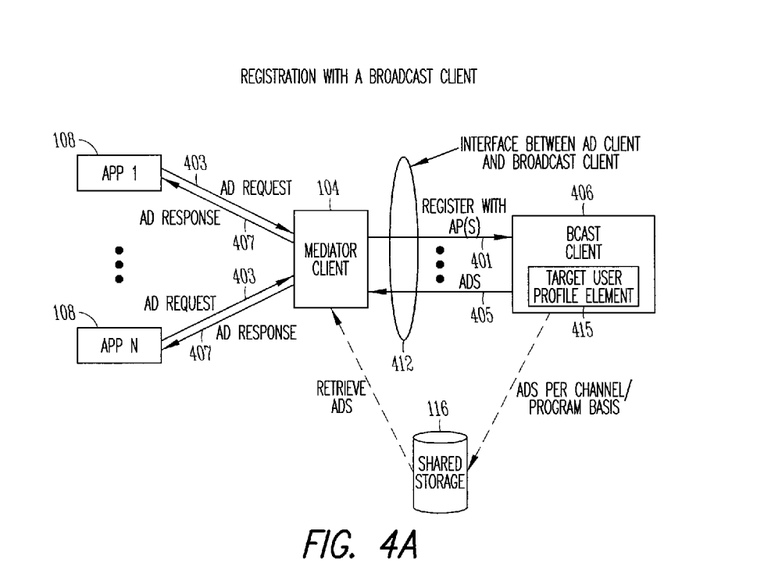
FIGS. 4A and 4B illustrate the operation of a mediator client when registering with a broadcast client in accordance with some embodiments.
Figure 4B:
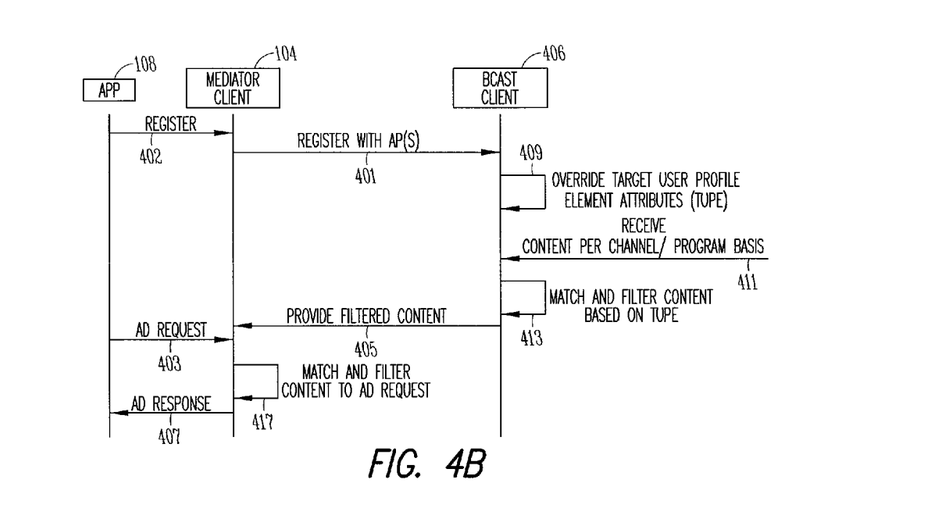

FIGS. 4A and 4B illustrate the operation of a mediator client when registering with a broadcast client in accordance with some embodiments. In these embodiments, delivery client 106 (FIG. 1) may be broadcast data facade client, such as BCAST client 406 and may operate in accordance with the OMA BCAST specifications. In these broadcast mode embodiments, mediator client 104 may register with BCAST client 406 using either a consolidated AP 401 or multiple APs 401. The parameters of AP 401 generated by mediator client 104 may, be included within target user profile element (TUPE) 415. In these embodiments, mediator client 104 may register with BCAST client 406 through interface 412, which may be defined between mediator client 104 and BCAST client 406. Broadcasted content may be filtered by BCAST client 406 or delivery server 130 (FIG. 1) operating as a BCAST server according to the same or similar parameters of mediator client 104. The information from applications 108 used to generate AP 401 may be obtained, for example, when applications 108 register with mediator client 104 during registration 402, although the scope of the embodiments is not limited in this respect.

In some embodiments, mediator client 104 may register with BCAST client 406 and subscribe (e.g., select from a service guide) for one or more channels. Mediator client 104 may submit AP 401 through interface 402. AP 401 may override target user profile element 415 in operation 409. BCAST client 406 may receive content 411 on a per-channel or per program basis and may match and filter the content in operation 413 based on target user profile element 415 (which may be based on information from consolidated AP 401). BCAST client 406 may provide filtered content 405 to mediator client 104 based on parameter of AP 401 for the registered channels. Mediator client 104 may match and filter filtered content 405 in operation 417 in response to ad requests 403 to provided targeted content to applications 108 in ad response messages 407.

In some of these embodiments, shared storage element 116 may store ads 405 provided by BCAST client 406. Mediator client 104 may retrieve selected ads directly from shared storage element and may provide the selected ads to applications 108 in ad response messages 407, either directly or indirectly by link.

In these embodiments, the parameters of AP 401 of mediator client 104 may be replicated into target user profile element 407 and may vary with the particular embodiment. For example, in embodiments in which mobile subscriber terminal 102 (FIG. 1) includes mediator client 104 and BCAST client 406 (as delivery client 106 (FIG. 1)), interface 402 may be defined to transfer the AP parameters into target user profile element 407 and may allow ads, delivered via broadcast, to be pass from BCAST client 406 to mediator client 104, in some cases, without additional processing.

In embodiments in which mobile subscriber terminal 102 (FIG. 1) includes mediator client 104 and both BCAST client 406 and a DCD client, the DCD client may be configured to use the AP of mediator client 104 to update target user profile element 415 of BCAST client 406. An interface from the DCD client to BCAST client 406, which may be defined by the DCD specification, may be provided. Accordingly, a separate interface between mediator client 104 and BCAST client 406 may not necessarily be needed.

Figure 5A:
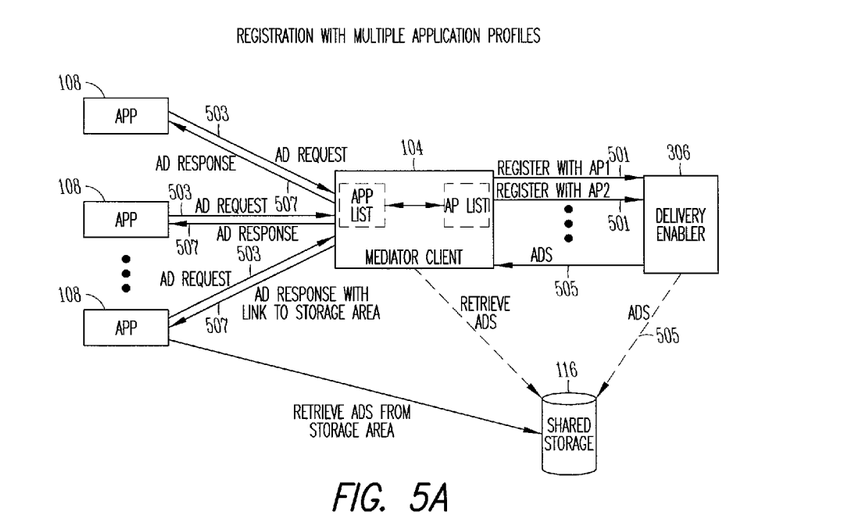
FIGS. 5A and 5B illustrate the operation of a mediator client when registering with multiple application profiles (APs) in accordance with some embodiments.
Figure 5B:
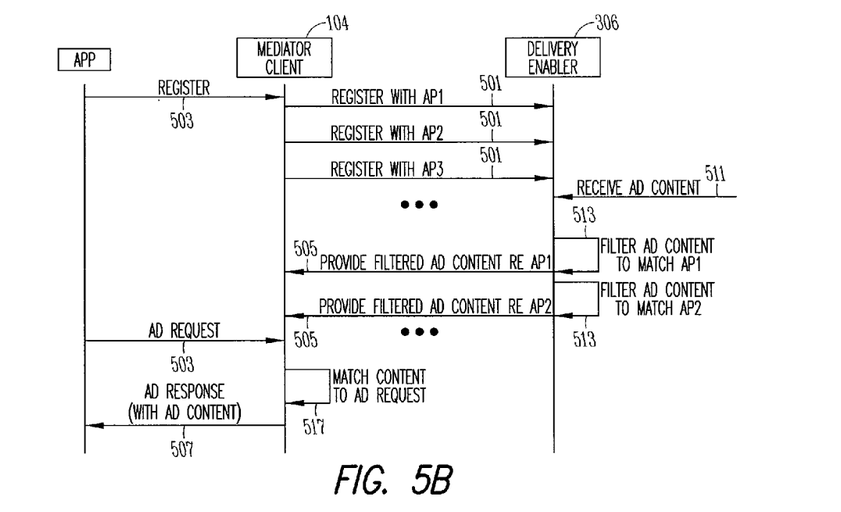

FIGS. 5A and 5B illustrate the operation of a mediator client when registering with multiple application profiles (APs) in accordance with some embodiments. In these embodiments, mediator client 104 is configured to generate multiple APs 501. Delivery enabler 306 may comprise delivery client 106 (FIG. 1) and delivery server 130 (FIG. 1). In these embodiments, mediator client 104 may generate one AP 501 for each application 108 or one AP 501 for each group of applications 108. Mediator client 104 may perform a one-to-one, a one-to-many or a many-to-many mapping between applications 108 and APs 501. In these embodiments, mediator client 104 may register with delivery client 106 (FIG. 1) of delivery enabler 306 multiple times providing different APs 501. In these embodiments, delivery client 106 (FIG. 1) views mediator client 104 as multiple applications with preferences expressed in each of the various APs 501. Delivery client 106 (FIG. 1) may be unaware of applications 108 behind mediator client 104 and accordingly, provides filtered ad content 505 to mediator client 104 according to the multiple APs 501.

In some embodiments, when applications 108 register in operation 503 with mediator client 104, each application 108 may provide either an application AP or application preferences. Mediator client 104 may use the application AP or the application preferences to generate one of APs 501 corresponding to the associated application 108. Mediator client 104 may also obtain ad-related preferences of applications 108 by other techniques (e.g., dynamically, or based on ad requests 503 as discussed above).

In these embodiments, mediator client 104 may perform a mapping between the applications IDs and APs 501. Each AP 501 submitted to delivery client 106 (FIG. 1) may include a unique mediator client identifier which may include the name, the URI and/or the application identifier of the associated application 108 or group of applications 108. In some alternate embodiments, the application identifier may be a generic alphanumeric string in which case mediator client 104 may maintain the mapping between the application identifiers and the associated applications 108 or groups of applications 108. When received from delivery client 106 (FIG. 1) operating as the data facade, ad content 505 may be associated with a specific mediator client identifier allowing mediator client 104 to identify the target application (one or more of applications 108) in operation 517 without additional analysis or processing.

In some embodiments, when multiple applications 108 have similar preferences, mediator client 104 may combine these preferences into a consolidated AP. Alternatively, a consolidated AP may also be a combination of preferences of different applications, rather than a consolidation of similar preferences. The ads received according to the consolidated AP may be provided to the corresponding applications 108 using a many-to-one mapping between applications 108 and the consolidated AP respectively.

In these embodiments, shared storage element 116 may store ads 505 provided by delivery client 106 (FIG. 1). Mediator client 104 may retrieve selected ads directly from shared storage element and may provide the selected ads to applications 108 in ad response messages 507, either directly or indirectly by link.

In embodiments that support a broadcast data facade (e.g., where delivery client 106 (FIG. 1) operates as BCAST client 406 (FIGS. 4A and 4B)), mediator client 104 may register with the BCAST client for multiple services or program channels belonging to the same category or genre (for e.g. sports, news, business) and receive the filtered ads based on target user profile element parameters provided by mediator client 104. Mediator client 104 may generate a mapping of applications 108 to a single consolidated AP and provide a mapping of the single consolidated AP to a broadcast channel. In these embodiments, one AP may correspond to a broadcast channel and mediator client 104 may generate the single AP based on this constraint. Thus, applications 108 that are mapped to this single AP are mapped to a given broadcast channel.

Mobile advertising is just one example of mediated data facade use described herein (i.e., when an application, such as mediator client 104, operates as an intermediary between a delivery enabler, such as delivery enabler 306, and target applications, such as applications 108). Embodiments are also applicable to general mediated usage of a data facade.

Although FIGS. 3A and 3B, FIGS. 4A and 4B, and FIGS. 5A and 5B illustrate embodiments applicable to providing targeted advertising to applications 108, the scope of these embodiments is not limited in this respect as these embodiments are equally applicable to the providing of any targeted content.

Figure 6A:
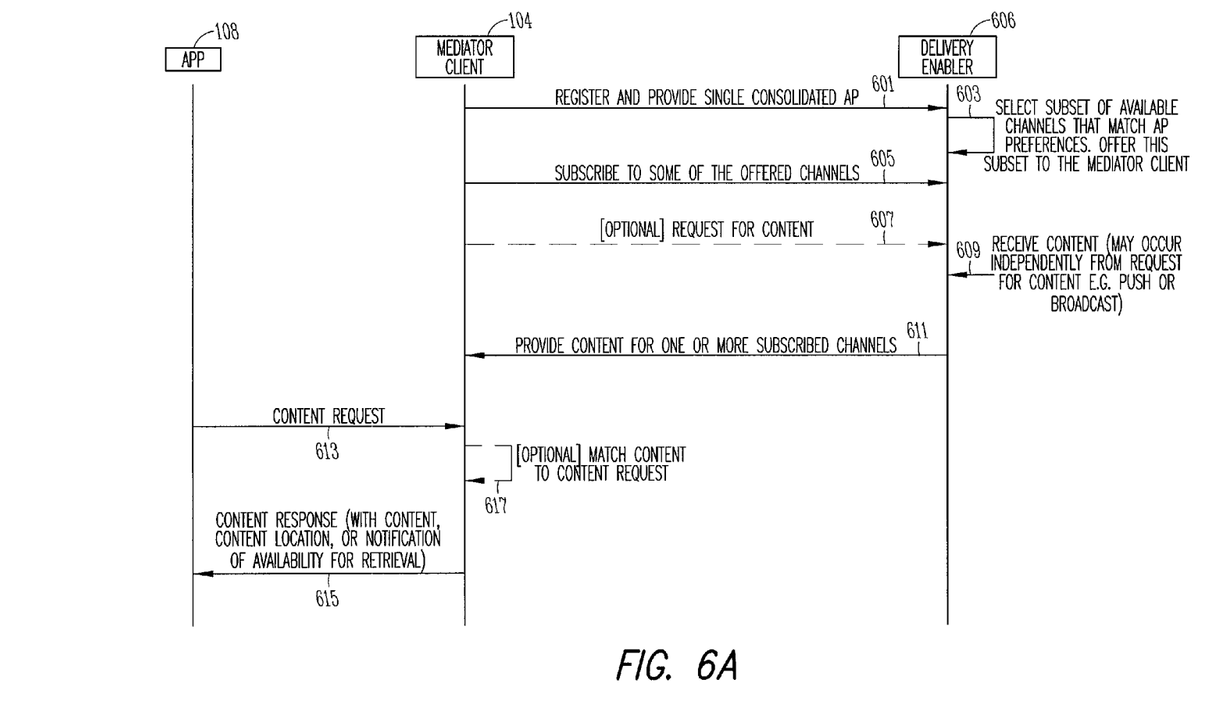
FIGS. 6A and 6B illustrate the operation of a mediator client when using an application profile (AP) for channel selection in accordance with some embodiments.
Figure 6B:
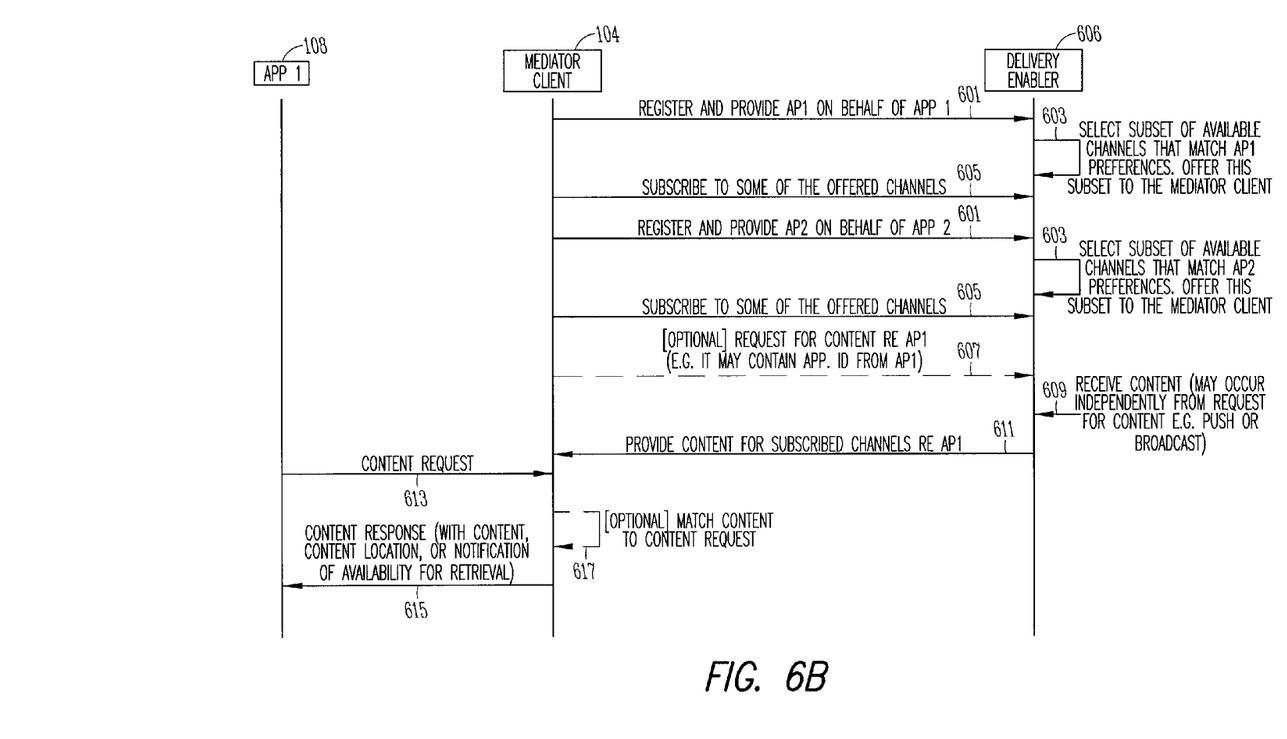

FIGS. 6A and 6B illustrate the operation of a mediator client when using an application profile (AP) for channel selection in accordance with some embodiments. In FIG. 6A, mediator client 204 may use a single consolidated AP for registering with delivery enabler 606 in operation 601. The single consolidated AP may consolidate preferences of more than one of applications 108 as discussed above. In FIG. 6B, mediator client 104 may use one AP on behalf of each application 108 for registering with delivery enabler 606 in operations 651. Delivery enabler 606 may include delivery client 106 (FIG. 1) and delivery server 130 (FIG. 1).

Referring to FIG. 6A, in response to receipt of either a single consolidated AP in operation 601, delivery enabler 606 may select a subset of available channels that match the preferences of the received AP and may offer the subset to mediator client in operation 603. Mediator client 104 may subscribe to some of the offered channels in operation 605, and may optionally request content in operation 607. Delivery enabler 606 may receive content in operation 609, which may occur independently of any request for content from mediator client 104. In operation 611, delivery enabler 606 may provide content to mediator client 104 for one or more of the subscribed channels based on the AP. Mediator client 104 may provide content to applications 108 in response to content request 613 in content response message 615. In some embodiments, mediator client 104 may match content to content request 613 in operation 617. In FIG. 6B, since mediator client 104 registers with delivery enabler 606 with an AP for each application 108, operations 601, 603, 605, 607 and 611 may be performed for each AP that is used to register with delivery enabler 606.

Although the elements of the content delivery system 100 (FIG. 1) and mediator client 104 (FIG. 2) are illustrated as having several separate functional elements, one or more of the functional elements may be combined and may be implemented by combinations of hardware circuitry, software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of content delivery system 100 (FIG. 1) and mediator client 104 (FIG. 2) may refer to one or more processes operating on one or more processing elements.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Some embodiments may be implemented in one or a combination of hardware, firmware and software. These embodiments may also be implemented as instructions stored on a computer-readable storage medium, which may be read and executed by at least one processor to perform the operations described herein. A computer-readable medium may include any tangible medium for storing or transmitting information in a form readable by a machine (e.g., a computer). For example, a computer-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A mobile subscriber terminal to receive targeted content comprising:
   a mediator client to generate an application profile based on ad-related preferences of applications which are registered with the mediator client, wherein the mediator client is configured in accordance with an Open Mobile Alliance (OMA) Dynamic Content Delivery (DCD) specification to operate as a DCD enabled client application (DECA); and
   a delivery client for accessing and providing server side content to the mediator client based on the application profile,
   wherein the mediator client is configured to submit the application profile to the delivery client and configured to operate as an intermediary between applications and the delivery client to select and provide targeted content to the applications and wherein the delivery client is configured in accordance with an OMA DCD specification.

2. The mobile subscriber terminal of claim 1 wherein the mediator client is configured to submit more than one application profile to the delivery client, the delivery client being operable to interpret the mediator client as more than one application, each application profile being associated with a corresponding application identifier, and
   wherein the mediator client is configured to associate content received from the delivery client with one of the applications or a group of the applications based on the application identifier.

3. The mobile subscriber terminal of claim 1 wherein the mobile subscriber terminal includes one or more of the applications configured to request advertisements (ads).

4. The mobile subscriber terminal of claim 3 wherein the mediator client is configured to:
   receive ad-related preferences from the applications during registration of the applications with the mediator client for use in generating the application profile; and
   generate ad-related preferences for at least one of the applications based on the information received in an ad request submitted by the one application.

5. The mobile subscriber terminal of claim 3 wherein the mediator client submits a mediator client identifier to the delivery client, the mediator client identifier being one attribute of the application profile, and
   wherein the mediator client identifier includes one or more of an application name, a universal resource identifier (URI), or hash code associated with either one of the applications or a group of the applications.

6. The mobile subscriber terminal of claim 3 wherein the mediator client is configured to include channel selection metadata within the application profile when submitting the application profile to the delivery client, and
   wherein the mediator client is configured to include general ad-related preferences in a content-type field of the channel selection metadata,
   wherein the channel selection metadata includes at least one of MIME types and content types.

7. The mobile subscriber terminal of claim 6 wherein an Extensible Markup Language (XML) schema extension mechanism is used to define additional namespace and schema of the content-type field to specify attributes and elements related to the preferences.

8. The mobile subscriber terminal of claim 1 wherein the application profile is a consolidated application profile,
   wherein the mediator client is configured to combine preferences of at least some of the applications to generate the consolidated application profile,
   wherein the mediator client is further configured to include shared information common to the applications in the consolidated application profile.

9. The mobile subscriber terminal of claim 1 wherein the application profile is a consolidated application profile, wherein the mediator client is configured to combine preferences common to the applications that relate to one or more of capabilities of the mobile subscriber terminal, a user profile and the interests of the user, and wherein the mediator client is further configured to include contextual information describing a state of the mobile subscriber terminal, the contextual information including at least one of location of the terminal or presence state of a user.

10. The mobile subscriber terminal of claim 1 wherein the mediator client is configured to submit to the delivery client either multiple application profiles for the applications or a consolidated application profile for a group of the applications, and wherein the mediator client is configured to perform a one to one, a one to many, and a many to many mapping between the applications and the application profiles.

11. The mobile subscriber terminal of claim 10 wherein the mediator client comprises:

an application profile generator to generate the application profile;

a content selector to perform the ad selection; and a memory to store an application list identifying each of the applications, wherein the memory is further configured to store an application profile list when more than one application profile is used to register with the delivery client, the application profile list identifying either a single application profile or a consolidated application profile associated with the applications.

12. The mobile subscriber terminal of claim 10 wherein the one or more applications, the mediator client, and the delivery client operate on an application layer of the mobile subscriber terminal and comprise one or more software-configured processing elements, wherein the mobile subscriber terminal further comprises a physical layer to communicate with a wireless transmission network for receipt of advertisement content from the delivery server, and wherein the delivery client interfaces with the delivery server through the wireless transmission network.

13. The mobile subscriber terminal of claim 1, wherein the mediator client is configured to submit a single application profile for each of the applications when ad-related preferences of the applications vary significantly, wherein the mediator client is configured to submit a consolidated application profile when the ad-related preferences of the applications do not vary significantly, and wherein the mediator client is configured to combine ad-related preferences of at least some the applications to generate the consolidated application profile.

14. The mobile subscriber terminal of claim 1 further comprising a shared storage element to store ads provided by the delivery client, wherein the delivery client is configured to provide the ads for storage in the shared storage element based on the application profile generated by the mediator client, and wherein the mediator client is configured to retrieve ads from the shared storage element, perform filtering and selection functions and provide the retrieved ads to the applications in ad-response messages.

15. The mobile subscriber terminal of claim 14 wherein the mediator client is configured to:

identify, filter and select ads stored in the shared storage element; and provide links to the selected ads to the applications in ad-response messages, wherein the applications are configured to retrieve the identified ads directly from the shared storage element using the provided links.

16. A method comprising:

generating, at a mediator client on a mobile subscriber terminal, an application profile from ad-related preferences of applications which are registered with the mediator client;

registering with a delivery client using the application profile; and selecting and providing content, which is received from the delivery client, to applications based on the preferences, wherein a mediator client operates as an intermediary between the applications and the delivery client to provide targeted content to the applications.

* * * * *